(12) United States Patent
Zhang et al.

(10) Patent No.: US 10,714,244 B2
(45) Date of Patent: Jul. 14, 2020

(54) NANO-POROUS ALLOYS WITH STRONG PERMANENT MAGNETISM AND PREPARATION METHOD THEREFOR

(71) Applicant: DALIAN UNIVERSITY OF TECHNOLOGY, Liaoning (CN)

(72) Inventors: Wei Zhang, Liaoning (CN); Yingmin Wang, Liaoning (CN); Yanhui Li, Liaoning (CN); Dianguo Ma, Liaoning (CN)

(73) Assignee: DALIAN UNIVERSITY OF TECHNOLOGY, Dalian Liaoning (CN)

( * ) Notice: Subject to any disclaimer, the term of this patent is extended or adjusted under 35 U.S.C. 154(b) by 339 days.

(21) Appl. No.: 15/572,707

(22) PCT Filed: May 13, 2016

(86) PCT No.: PCT/CN2016/081959
§ 371 (c)(1),
(2) Date: Nov. 8, 2017

(87) PCT Pub. No.: WO2016/180359
PCT Pub. Date: Nov. 17, 2016

(65) Prior Publication Data
US 2018/0114615 A1     Apr. 26, 2018

(30) Foreign Application Priority Data

May 14, 2015   (CN) .......................... 2015 1 0246416

(51) Int. Cl.
*H01F 1/047*     (2006.01)
*C22C 5/04*      (2006.01)
(Continued)

(52) U.S. Cl.
CPC ............... *H01F 1/047* (2013.01); *C22C 5/04* (2013.01); *C22C 38/002* (2013.01); *C22C 38/10* (2013.01);
(Continued)

(58) Field of Classification Search
CPC ... B22F 2999/00; C22C 2202/02; C22C 1/08; C22C 5/04; B82Y 30/00; B82Y 40/00; H01F 10/123; H01F 1/047; H01F 41/0253
(Continued)

(56) References Cited

U.S. PATENT DOCUMENTS

| | | | |
|---|---|---|---|
| 8,377,580 B2* | 2/2013 | Makino | ................. C22C 33/003 428/826 |
| 2006/0222903 A1* | 10/2006 | Ichihara | ................... G11B 5/66 428/827 |

FOREIGN PATENT DOCUMENTS

| | | |
|---|---|---|
| CN | 101667480 A | 3/2010 |
| CN | 103938014 A | 7/2014 |

(Continued)

OTHER PUBLICATIONS

NPL: Xu et al, Hierarchical Nanoporous PtFe alloy with Multimodal size Distributions and its Catalytic Performance toward Methanol Electrooxidation, Langmuir, ACS Publications, vol. 28, 2012, pp. 1886-1892) (Year: 2012).*

(Continued)

*Primary Examiner* — Jie Yang
(74) *Attorney, Agent, or Firm* — Muncy, Geissler, Olds & Lowe, P.C.

(57) ABSTRACT

A kind of nano-porous Fe—Pt alloys with strong permanent magnetism and a preparation method therefor. The nano-porous Fe—Pt alloys have the composition of $Fe_wCo_xPt_yPd_z$ and are composed of an ordered hard magnetic $L1_0$-FePt
(Continued)

phase, and have an integrated doubly-connected nano-porous structure with pore sizes of 10-50 nm, and ligament thicknesses of 20-80 nm. Under an applied magnetic field of 50 kOe, the coercivity, magnetization intensity and remanence of the alloys are 13.4-18.5 kOe, 40.4-56.3 emu/g and 28.3-37.4 emu/g, respectively. The master alloy ingots are prepared using electric arc melting or induction melting; the alloy ribbons are prepared using the single-roller melt-spinning equipment; the precursors mainly containing nanocomposite phases of hard magnetic $L1_0$-FePt and soft magnetic $Fe_2B$ are obtained directly by the melt-spinning or obtained by conducting vacuum annealing on the melt-spun ribbons; and the nano-porous Fe—Pt alloys with a single $L1_0$-FePt phase are obtained by the electrochemical dealloying technique, thereby filling in the technical blank of nano-porous metal materials with permanent magnetism.

2 Claims, 2 Drawing Sheets

(51) Int. Cl.
| | | |
|---|---|---|
| H01F 10/12 | (2006.01) | |
| C22C 38/00 | (2006.01) | |
| C22C 38/10 | (2006.01) | |
| C22C 1/08 | (2006.01) | |
| B82Y 30/00 | (2011.01) | |
| B82Y 40/00 | (2011.01) | |
| H01F 41/02 | (2006.01) | |

(52) U.S. Cl.
CPC ........ H01F 10/123 (2013.01); *B22F 2999/00* (2013.01); *B82Y 30/00* (2013.01); *B82Y 40/00* (2013.01); *C22C 1/08* (2013.01); *C22C 2202/02* (2013.01); *H01F 41/0253* (2013.01)

(58) Field of Classification Search
USPC .......................................... 148/311
See application file for complete search history.

(56) References Cited

FOREIGN PATENT DOCUMENTS

| | | |
|---|---|---|
| CN | 104946921 A | 9/2015 |
| EP | 1270756 A1 | 1/2003 |
| WO | WO 2004107482 A1 | 12/2004 |

OTHER PUBLICATIONS

NPL-1: Xu et al Hierarchical Nanoporous PtFe alloy with Multimodal size Distributions and its Catalytic Performance toward Methanol Electrooxidation, Langmuir, ACS Publications, vol. 28, 2012, pp. 1886-1892, (Year: 2012).*

* cited by examiner

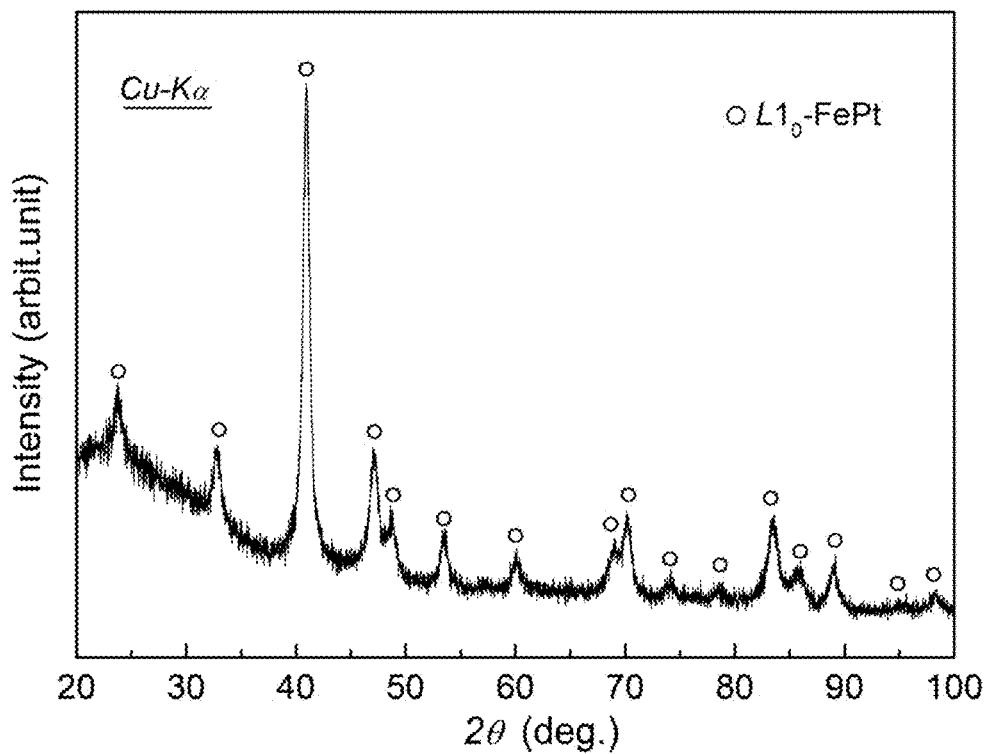
Figure 1
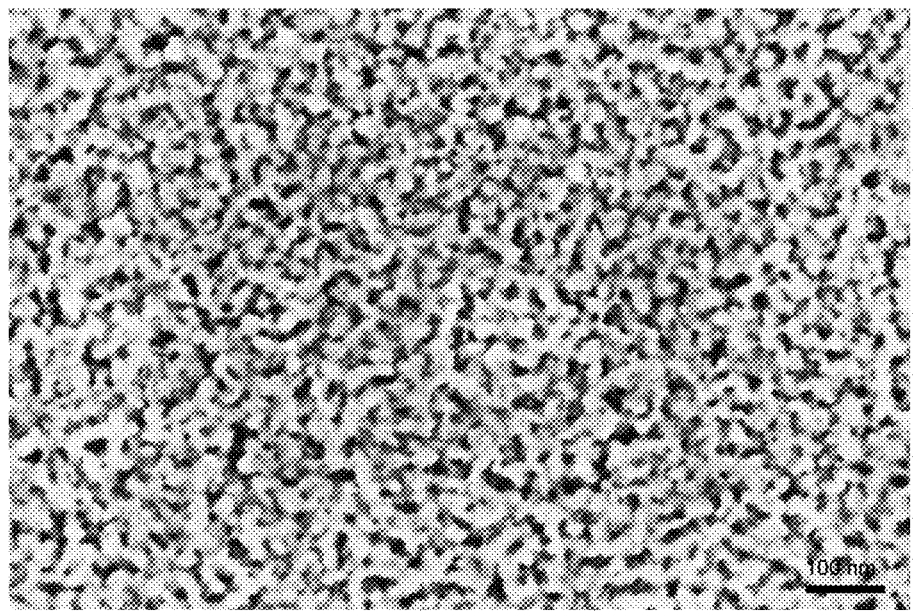
Figure 2 (As a summary)

NANO-POROUS ALLOYS WITH STRONG PERMANENT MAGNETISM AND PREPARATION METHOD THEREFOR

TECHNICAL FIELD

The present invention relates to a kind of nano-porous alloys with strong permanent magnetism and a preparation method therefor, which belongs to the technical field of new materials.

BACKGROUND

Nano-porous metals refer to the metal materials having a porous structure composed of nano-size pores and adjacent metal ligaments. Nano-porous metal materials have the combined characteristics of nano materials, porous materials, and metal materials, have excellent physical, chemical and mechanical properties, such as nano-surface effect, high specific surface area, good electrical conductivity and thermal conductivity, etc., and have a wide application prospect in the fields of catalysis, separation, electron, optics, biomedicine and the like.

In recent years, due to the simple technique and high efficiency in preparation, the dealloying method has become an optimization method to prepare nano-porous metals. The method is a selective corrosion technology. The elements or alloy phases with relatively high chemical activity in the alloys are corroded under a chemical or electrochemical condition, and a nano-porous structure is formed by the remaining inert elements or corrosion-resistant alloy phases with relatively weak chemical activity through diffusion and/or self-organization. In accordance with the technique principle of the dealloying method, the composition and microstructure of the primary alloys (i.e. the precursors) suitable for preparing the nano-porous metal materials through the dealloying method must be uniform enough. In addition, a large electrode potential difference between the alloy elements, and fast enough diffusion velocity on the alloy/electrolytic solution interface for the inert elements should be considered. At present, most of the prepared nano-porous metals focus on the specific alloy systems containing noble metals and being capable of forming continuous solid solution single-phase alloy, for example, Au—Ag, Au—Zn, Au—Cu, Pt—Cu, Pd—Co, etc. Elements of these alloy systems are relatively monotonous in category, and limited in function characteristics.

Amorphous and/or amorphous+nanocrystalline alloys prepared by the melt-spinning technology have homogeneous composition and microstructure and various constituent element categories, and the size of the nanocrystalline grains can be controlled through the subsequent heat treatment. Therefore, amorphous/nanocrystalline alloys are suitable for preparing nano-porous metals as precursor materials. Moreover, in combination with the appropriate heat treatment and dealloying technique, not only alloy phases with different characteristics can be reserved or removed, but also the size of the formed nanopores can be controlled, so that nano-porous metal materials with specific function characteristics and controllable aperture can be prepared. Yu et al reported that nano-porous Pd can be successfully prepared using a $Ni_{50}Pd_{30}P_{20}$ amorphous ribbon through dealloying [Yu et al, Chem Mater, 20(2010): 4548]. China invention patent CN102943187A disclosed a preparation method for preparing nano-porous Cu using Cu—Hf—Al noncrystalline. The applicant of this patent and the cooperator successfully prepared Au—Pd porous alloys with excellent catalytic activity and electrochemical stability by dealloying an $Au_{30}Si_{20}Cu_{33}Ag_7Pd_{10}$ amorphous alloy [Lang et al, J Phys Chem C, 114(2010): 2600].

At present, the study on the nano-porous materials mainly focus on the fields of surface catalysis, biomedicine, sensing, filtration, surface enhanced Raman scattering, hydrogen storage and the like, but little study has been done on the magnetism of the nano-porous metals. Hakamada et al. prepared nano-porous Ni using electrochemical dealloying [Hakamada et al, Appl Phys Lett, 94(2009): 153105], but the coercivity is only about 100 Oe. There were few reports on the preparation of the nano-porous alloys with permanent magnetism using the dealloying method.

Ordered face-centered cubic $L1_0$-FePt phase shows excellent permanent magnetism due to the large uniaxial magnetocrystalline anisotropy, and has high saturation magnetization at room temperature. In combination with good wear- and corrosion-resistant and antioxidant characteristics of the Fe—Pt alloy, the Fe—Pt permanent-magnetic materials containing the $L1_0$-FePt phase can be applied to micro-electromechanical systems (MEMS), medical care, magnetic recording, and other fields. At present, most of the Fe—Pt alloys with permanent magnetism are in forms of bulk [Xiao et al, J Alloy Compd, 364(2004): 315; Gopalan et al, J Magn Magn Mater, 322(2010): 3423], film [Chen et al, J Magn Magn Mater, 239(2002: 471; Li et al, J Magn Magn Mater, 205(1999): 1] or nano particle [Takahashi et al, J Appl Phys, 95(2004): 2690; Sun et al, IEEE T Magn, 37(2001): 1239]. It is still a blank to prepare nano-porous Fe—Pt alloys with permanent magnetism. The applicant of this patent finds that the Fe—Pt—B amorphous or amorphous+ nanocrystalline alloy ribbons prepared by the melt-spinning technology may generate permanent magnets containing uniformly distributed nano-composite phases of ordered hard magnetic $L1_0$-FePt and soft magnetic $Fe_2B$ phases after appropriate heat treatment [Zhang et al, Appl Phys Lett, 85(2004): 4998; Zhang et al, J Alloy Compd, 615(2014): S252]. If the soft magnetic phases such as $Fe_2B$ in the alloys are removed using the appropriate dealloying technique subsequently, the nano-porous metal alloys containing single hard magnetic phase of $L1_0$-FePt are hopefully prepared, and the permanent magnetism thereof is further improved, thereby expanding the application range thereof.

SUMMARY

Aiming at the blank of the technology for preparing nano-porous metal materials with permanent magnetism using the dealloying method, the present invention provides a kind of nano-porous Fe—Pt alloys with strong permanent magnetism and integrated, uniform and controllable nano-porous structure, and a preparation method therefor.

The present invention adopts the following technical solution:

A kinds of nano-porous Fe—Pt alloys with strong permanent magnetism, which has the chemical composition of $Fe_wCo_xPt_yPd_z$, w, x, y and z respectively representing atomic percent of each corresponding element in the expression, where $30 \leq w \leq 55$, $0 \leq x \leq 25$, $45 \leq w+x \leq 55$, $45 \leq y \leq 55$, $0 \leq z \leq 10$, $45 \leq y+z \leq 55$ and $w+x+y+z=100$; the expression of the composition of the precursors for preparing the nano-porous alloys is $Fe_aCo_bPt_cPd_dB_eC_fP_gSi_h$, a, b c, d, e, f, g and h respectively representing atomic percent of each corresponding element in the expression, where $30 \leq a \leq 70$, $0 \leq b \leq 30$, $40 \leq a+b \leq 70$, $8 \leq c \leq 40$, $0 \leq d \leq 5$, $8 \leq c+d \leq 40$, $10 \leq e \leq 35$, $0 \leq f \leq 5$, $0 \leq g \leq 5$, $0 \leq h \leq 3$, $10 \leq e+f+g+h \leq 35$, and $a+b+c+d+e+f+g+h=100$. (Similarly hereinafter).

The provided nano-porous Fe—Pt alloys with strong permanent magnetism are composed of the ordered hard magnetic $L1_0$-FePt phase, have a doubly-connected porous structure, and are integrated in structure and uniform in pore size, and the pore size and ligament thickness thereof are respectively controlled within 10-50 nm and 20-80 nm according to the precursor alloy composition proportion, the precursor preparation and dealloying technique.

The provided nano-porous Fe—Pt alloys have strong permanent magnetism: under an applied magnetic field of 50 kOe, the coercivity is 13.4-18.5 kOe, the magnetization is 40.4-56.3 emu/g, and the remanence is 28.3-37.4 emu/g.

The present invention further provides a preparation method for the nano-porous alloys with strong permanent magnetism, comprising the following steps:

(1) The (Fe, Co)—(Pt, Pd)—(B, C, P, Si) master alloy ingots are prepared using electric arc melting or high-frequency induction melting under an Ar atmosphere;

(2) The amorphous or amorphous+ nanocrystalline alloy ribbons are prepared using the single-roller melt-spinning technology, and the thickness and phase structure of the ribbons are controlled by the rotational speed of the copper roller;

(3) The precursors containing uniformly distributed nano-composite phases of hard magnetic $L1_0$-FePt and soft magnetic $Fe_2B$ are directly obtained by the melt-spinning or obtained by conducting vacuum annealing on the melt-spun ribbon samples; and in some precursors, in addition to $L1_0$-FePt and $Fe_2B$ phases, a few FeB and/or amorphous phases are also allowed;

(4) By taking the precursor as a working electrode, Ag/AgCl as a reference electrode, and an acid solution with the $H^+$ concentration of 0.02-1.0 mol/L as an electrolytic solution, the dealloying is conducted using the electrochemical technique under constant voltages of −0.28-1.5 V, the phases mainly including soft magnetic $Fe_2B$ except hard magnetic $L1_0$-FePt are selectively dissolved, and nano-porous Fe—Pt alloys with permanent magnetism containing a single $L1_0$-FePt phase are prepared.

The precursor alloys of the present invention belong to the Fe—Pt—B alloy system. The standard electrode potential is −0.89 V vs. standard hydrogen electrode (SHE) for $B^{3+}/B$, −0.44 V vs. SHE for $Fe^{2+}/Fe$, −0.04 V vs. SHE for $Fe^{3+}/Fe$, and +1.19 V vs. SHE for $Pt^{2+}/Pt$. Therefore, in the process of dealloying, the soft magnetic $Fe_2B$ soft magnetic phase containing Fe and B is selectively dissolved, and the hard magnetic $L1_0$-FePt phase containing Pt is reserved. In addition, the Fe—Pt—B alloys have good amorphous forming ability, hence the ribbon samples containing uniformly distributed nano-composite phases of hard magnetic $L1_0$-FePt and soft magnetic $Fe_2B$ are easily obtained through the melt-spinning and subsequent heat treatment, to guarantee the homogeneity of the chemical composition and phase structure of the precursor alloys. The purpose of adding elements Co, Pd and (C, P, Si) being similar to Fe, Pt and B, respectively, is to further improve the amorphous forming ability of the alloys. The above are all beneficial to obtaining high-quality nano-porous Fe—Pt alloys with permanent magnetism containing a single $L1_0$-FePt phase.

The steps of implementing the above-mentioned technical solution of the present invention include:

(1) Raw materials including Fe, Co, Pt, Pd, B, C, $Fe_3P$, and Si with the purity of ≥99 wt. % are weighed and mixed according to the nominal composition of $Fe_aCo_bPt_cPd_dB_eC_fP_gSi_h$;

(2) The alloys containing P and/or C element(s) are prepared into master alloy ingots using high-frequency induction melting under an Ar atmosphere, and the P- and C-free alloys are prepared into master alloy ingots using a nonconsumable electric-arc furnace under an Ar atmosphere; the alloys are repeatedly melted for four times to guarantee chemical homogeneity; the master alloy ingots are spun into continuous ribbon samples with a width of about 2 mm and thicknesses of about 10-50 μm using a single-roller melt-spinning equipment under an Ar atmosphere; and the ribbon thickness is controlled by the rotational speed of the copper roller (i.e., melt-spinning speed);

(3) The structure and thermal properties of the alloy ribbon samples prepared at different rotational speeds of the copper roller are examined; the annealing temperature of the alloy ribbons is determined in combination of the structure and thermal analysis; and if the alloy ribbons contain a nano-composite phase structure of hard magnetic $L1_0$-FePt and soft magnetic $Fe_2B$, step (5) is directly performed; otherwise, step (4) is performed;

(4) The alloy ribbons are annealed using vacuum heat treatment to obtain ribbon precursors mainly containing nano-composite phases of hard magnetic $L1_0$-FePt and soft magnetic $Fe_2B$;

(5) The nanocrystalline ribbon precursors are dealloyed by an electrochemical workstation, the phases mainly including soft magnetic $Fe_2B$ except hard magnetic $L1_0$-FePt are selectively dissolved, and the nano-porous Fe—Pt alloys with strong permanent magnetism containing a single $L1_0$-FePt phase are prepared; and (6) The structure characterization, morphology observation and magnetic property tests are conducted on the obtained nano-porous metals.

The structure of each of the ribbon samples, the precursor alloys and the dealloyed nano-porous metals is characterized by an X-ray diffractometer (XRD, Cu-Kα radiation, λ=0.15406 nm) and a high-resolution transmission electron microscope (HRTEM); the morphology of the nano-porous metal is observed through a scanning electron microscope (SEM); the ligament composition of the nano-porous metal is determined by Energy Dispersive X-Ray (EDX) spectrum analysis; the thermal properties of the melt-spun ribbons are evaluated by a differential scanning calorimeter (DSC); the electrochemical properties of the precursor alloys are evaluated by an electrochemical workstation; and the magnetic properties of the alloy ribbons and the nano-porous metals are tested using a superconducting quantum interference device (SQUID) with the maximum applied magnetic field of 50 kOe.

The present invention fills in the blank of technology for preparing metal nano-porous materials with permanent magnetism by a dealloying method, and expands the application fields of nano-porous metals. The nano-porous Fe—Pt alloys with strong permanent magnetism containing a single $L1_0$-FePt phase are obtained by the simple dealloying method. The nano-porous permanent magnets with uniform and integrated doubly-connected porous structure and controllable pore size and ligament thickness exhibit strong permanent magnetism. The provided alloys can not only be used as materials with highly strong permanent magnetism, magnetic filtration materials or magnetic adsorption materials, but also as self-assembled template materials to prepare high-performance permanent magnets with a nano-composite phase structure, thereby having a practical application value.

DESCRIPTION OF THE FIGURES

FIG. 1 shows an X-ray diffraction (XRD) pattern of a nano-porous Fe—Pt alloy obtained by dealloying a $Fe_{60}Pt_{10}B_{30}$ alloy ribbon after annealing at 823 K for 900 s.

FIG. 2 shows a secondary electron image of a scanning electron microscope (SEM) of a nano-porous Fe—Pt alloy obtained by dealloying a $Fe_{60}Pt_{10}B_{30}$ alloy ribbon after annealing at 823 K for 900 s.

DETAILED DESCRIPTION

Figure 3:
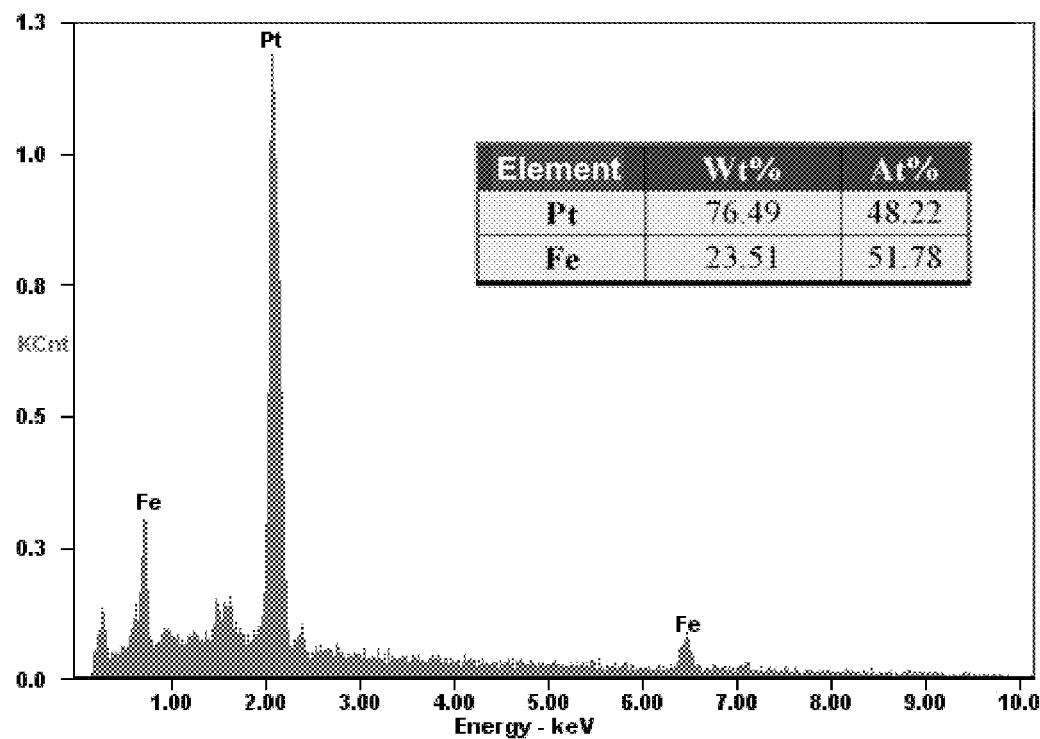
FIG. 3 shows an Energy Dispersive X-Ray (EDX) spectrum composition analysis result of a nano-porous Fe—Pt alloy obtained by dealloying a $Fe_{60}Pt_{10}B_{30}$ alloy ribbon after annealing at 823 K for 900 s.

The specific embodiments of the present invention are further described below in conjunction with the technical solution and the accompanying drawings.

Embodiment 1: Precursor Alloy Composition $Fe_{60}Pt_{10}B_{30}$

Step 1: Material Mixing

Raw materials including Fe, Pt and B with the purity of greater than 99 wt. % are weighed and mixed according to the nominal composition of $Fe_{60}Pt_{10}B_{30}$.

Step 2: Melting of Master Alloy Ingot and Preparation of Melt-Spun Ribbon

The weighed raw materials are mixed and then put in a water-cooled copper hearth of a non-consumable electric arc melting furnace, and repeatedly melted for four times under an Ar atmosphere to obtain an alloy ingot with homogeneous chemical composition. The master alloy ingot is crushed and then put in a quartz tube with a nozzle diameter of about 0.5 mm, and heated to a molten state through induction melting under an Ar atmosphere. The alloy melt is sprayed onto a copper roller rotating at high speed under a pressure difference, melt-spun at the linear speed of about 25-50 m/s, and a continuous alloy ribbon with a width of about 2 mm and a thickness of about 10-50 μm is obtained.

Step 3: Structure Characterization and Thermal Property Evaluation of Melt-Spun Alloy Ribbon The XRD (Cu-Kα radiation, λ=0.15406 nm) and HRTEM results confirm that the structure of the all alloy ribbons obtained at different melt-spinning speeds is amorphous phase. The DSC is used to evaluate the thermal properties of the ribbon. It is determined that the appropriate annealing temperature for the ribbon sample is 823 K in combination with structure analysis result.

Step 4: Preparation of Precursor Alloy

The melt-spun ribbon is put in the quartz tube, vacuumed to less than $2 \times 10^{-3}$ Pa and subsequently sealed. The ribbon sealed within the tube is put in the annealing furnace and annealed at the temperature of 783-863K for 900s, and then taken out and subsequently put in the cool water for quenching. The structure of the annealed alloy ribbon is detected by the XRD and the HRTEM, and the magnetic properties are tested using the SQUID under the maximum applied magnetic field of 50 kOe. In combination with structure and magnetic property analysis results, the alloy ribbon with nano-composite phases of hard magnetic $L1_0$-FePt and soft magnetic $Fe_2B$ and exhibiting optimum permanent magnetism as obtained by annealing at 823 K is selected as the precursor alloy.

Step 5: Electrochemical Property Test and Dealloying

The room-temperature electrochemical properties of the precursor alloy are evaluated by an electrochemical workstation at a scanning rate of 1 mV/s in a 0.1 mol/L $H_2SO_4$ solution, thereby measuring that the critical potential of the alloy is about −280 mV (vs Ag/AgCl reference electrode), and the corresponding operating voltage is in the range of −180−−45 mV when the current density is 20-50 m $A/cm^2$. A constant potential mode with a potential of −170 mV is selected to dealloy the precursor alloy, so as to prepare a nano-porous Fe—Pt alloy.

Figure 4:
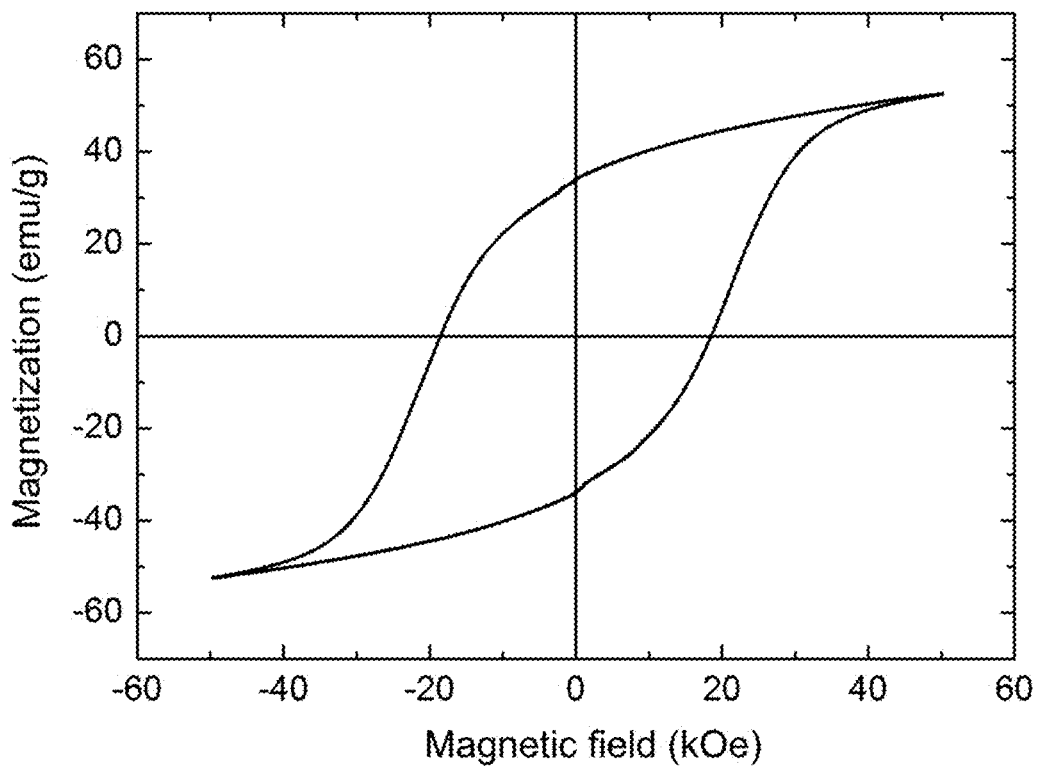
FIG. 4 shows a hysteresis loop of a nano-porous Fe—Pt alloy obtained by dealloying a $Fe_{60}Pt_{10}B_{30}$ alloy ribbon after annealing at 823 K for 900 s.

Step 6: Structure and Morphology Characterization and Magnetic Property Test of Nano-Porous Alloy As shown in FIG. 1, the XRD pattern reveals that the prepared nano-porous alloy has a single $L1_0$-FePt phase. The SEM image shown in FIG. 2 confirms that the alloy has a doubly-connected nano-porous structure, and is integrated in structure and uniform in pore size and ligament thickness, and both the pore size and the ligament thickness are about 20 nm. As shown in FIG. 3, the EDX spectrum analysis indicates that the alloy ligament only contains two elements of Fe and Pt with the chemical composition of $Fe_{48.2}Pt_{51.8}$, and is consistent with the result of the XRD. The magnetic properties of the alloy are tested using the SQUID under an applied magnetic field of 50 kOe. FIG. 4 shows a hysteresis loop of the prepared nano-porous alloy, indicating that the alloy has strong permanent magnetism: the coercivity ($_iH_c$), magnetization ($M_{50}$) and remanence ($M_r$) under the applied magnetic field of 50 kOe are 18.5 kOe, 52.6 emu/g and 34.0 emu/g, respectively.

Embodiment 2: Precursor Alloy Composition $Fe_{52}Pt_{29}B_{19}$

Steps of material mixing, melting of master alloy ingot, melt-spinning of ribbon sample and characterization of sample structure are the same as steps 1-3 in embodiment 1. The results of the XRD and HRTEM indicate that the ribbon prepared at the melt-spinning speed of 20-37 m/s has a nano-composite phase structure of $L1_0$-FePt and $Fe_2B$, and can be used as a precursor alloy for dealloying without heat treatment. Steps of electrochemical property test, dealloying and structure, morphology characterization and magnetic property test of the nano-porous alloy are the same as steps 5 and 6 in embodiment 1. The finally obtained nano-porous Fe—Pt alloy has the chemical composition of $Fe_{50.1}Pt_{49.9}$, and the $_iH_c$, $M_{50}$ and $M_r$ are 16.2 kOe, 51.9 emu/g, and 36.2 emu/g, respectively.

The present embodiment has the advantage that the heat treatment process can be selectively omitted, and the alloy ribbon can be directly dealloyed, so that the technique for preparing the nano-porous Fe—Pt alloy is more simple and efficient.

Embodiment 3: Precursor Alloy Composition $Fe_{50}Pt_{20}B_{30}$

The implementation step is the same as that in embodiment 2. The alloy ribbon prepared at the melt-spinning speed of 25-35 m/s has nano-composite phases of $L1_0$-FePt, $Fe_2B$ and FeB, and does not need the annealing process. The finally obtained nano-porous Fe—Pt alloy has the chemical composition of $Fe_{47.7}Pt_{52.3}$, and the $_iH_c$, $M_{50}$ and $M_r$ are 16.6 kOe, 47.8 emu/g and 32.8 emu/g, respectively.

Embodiment 4: Precursor Alloy Composition $Fe_{45}Pt_{25}B_{30}$

The implementation step is the same as that in embodiment 1. The finally obtained nano-porous Fe—Pt alloy has the chemical composition of $Fe_{46.5}N_{53.5}$, and the $_iH_c$, $M_{50}$ and $M_r$ are 14.7 kOe, 43.3 emu/g and 29.6 emu/g, respectively.

Embodiment 5: Precursor Alloy Composition $Fe_{60}Pt_{15}B_{25}$

The implementation step is the same as that in embodiment 1. The nano-porous Fe—Pt alloy finally obtained after annealing at 783 K for 900 s contains nano-composite phases of $L_{10}$-FePt and $Fe_2B$, and contains a certain proportion of amorphous phase at the same time. The finally obtained nano-porous Fe—Pt alloy has the chemical composition of $Fe_{49.2}N_{50.8}$, and the $_iH_c$, $M_{50}$ and $M_r$ are 18.1 kOe, 50.9 emu/g and 35.3 emu/g, respectively.

Embodiment 6: Precursor Alloy Composition $Fe_{60}Pt_{20}B_{20}$

The implementation step is the same as that in embodiment 1. The finally obtained nano-porous Fe—Pt alloy has the chemical composition of $Fe_{52.2}N_{47.8}$, and the $_iH_c$, $M_{50}$ and $M_r$ are 17.8 kOe, 53.9 emu/g and 37.2 emu/g, respectively.

Embodiment 7: Precursor Alloy Composition $Fe_{55}Pt_{25}B_{20}$

The implementation step is the same as that in embodiment 1. The finally obtained nano-porous Fe—Pt alloy has the chemical composition of $Fe_{52.5}N_{47.5}$, and $_iH_c$, $M_{50}$ and $M_r$ are 16.9 kOe, 52.4 emu/g and 33.6 emu/g, respectively.

Embodiment 8: Precursor Alloy Composition $Fe_{50}Pt_{30}B_{20}$

The implementation step is the same as that in embodiment 2. The structure of the alloy ribbon prepared at 35 m/s contains nano-composite phases of $L_{10}$-FePt and $Fe_2B$, and contains a certain proportion of amorphous phase at the same time. The alloy ribbon can be directly dealloyed as a precursor alloy without the annealing process. The finally obtained nano-porous Fe—Pt alloy has the chemical composition of $Fe_{45.3}N_{54.7}$, and the $_iH_c$, $M_{50}$ and $M_r$ are 15.9 kOe, 50.8 emu/g and 35.6 emu/g, respectively.

Embodiment 9: Precursor Alloy Composition $Fe_{40}Pt_{25}B_{35}$

The implementation step is the same as that in embodiment 1. The finally obtained nano-porous Fe—Pt alloy has the chemical composition of $Fe_{47.2}N_{52.8}$, and the $_iH_c$, $M_{50}$ and $M_r$ are 14.2 kOe, 40.4 emu/g and 28.3 emu/g, respectively.

Embodiment 10: Precursor Alloy Composition $Fe_{70}Pt_{10}B_{20}$

The implementation step is the same as that in embodiment 1. The finally obtained nano-porous Fe—Pt alloy has the chemical composition of $Fe_{54.5}N_{45.5}$, and the $_iH_c$, $M_{50}$ and $M_r$ are 13.4 kOe, 56.3 emu/g and 36.2 emu/g, respectively.

Embodiment 11: Precursor Alloy Composition $Fe_{30}Co_{30}Pt_{20}B_{20}$

The implementation step is the same as that in embodiment 1. The finally obtained nano-porous Fe—Pt alloy has the chemical composition of $Fe_{25.6}Co_{24.8}Pt_{49.6}$, and the $_iH_c$, $M_{50}$ and $M_r$ are 18.4 kOe, 42.1 emu/g and 30.3 emu/g, respectively.

Embodiment 12: Precursor Alloy Composition $Fe_{55}Pt_{20}Pd_5B_{20}$

The implementation step is the same as that in embodiment 1. The finally obtained nano-porous Fe—Pt alloy has the chemical composition of $Fe_{50.8}N_{39.8}Pd_{9.4}$, and the $_iH_c$, $M_{50}$ and $M_r$ are 17.0 kOe, 52.9 emu/g and 36.5 emu/g, respectively.

Embodiment 13: Precursor Alloy Composition $Fe_{55}Pt_{25}B_{15}C_5$

A master alloy ingot is obtained by high-frequency induction melting under an Ar atmosphere. The remaining implementation steps are the same as those in embodiment 1. The finally obtained nano-porous Fe—Pt alloy has the chemical composition of $Fe_{49.4}N_{50.6}$, and the $_iH_c$, $M_{50}$ and $M_r$ are 17.3 kOe, 51.1 emu/g and 36.4 emu/g, respectively.

Embodiment 14: Precursor Alloy Composition $Fe_{55}Pt_{25}B_{15}P_5$

A master alloy ingot is obtained by high-frequency induction melting under an Ar atmosphere. The remaining implementation steps are the same as those in embodiment 1. The finally obtained nano-porous Fe—Pt alloy has the chemical composition of $Fe_{46.3}N_{53.7}$, and the $_iH_c$, $M_{50}$ and $M_r$ are 17.9 kOe, 50.9 emu/g and 35.8 emu/g, respectively.

Embodiment 15: Precursor Alloy Composition $Fe_{55}Pt_{25}B_{17}Si_3$

The implementation step is the same as that in embodiment 1. The finally obtained nano-porous Fe—Pt alloy has the chemical composition of $Fe_{45.9}N_{54.1}$, and the $_iH_c$, $M_{50}$ and $M_r$ are 15.5 kOe, 53.8 emu/g and 37.4 emu/g, respectively.

Comparison example 1 ($Fe_{53}Pt_{44}C_3$) is selected from the literature [Gopalan et al, J Magn Magn Mater, 322(2010): 3423], and the alloy is a bulk material formed by spark plasma sintering the as-milled powder. The coercivity of the alloy is 11.1 kOe.

Comparison example 2 ($Fe_{50}Pt_{50}$) is selected from the literature [Chen et al, J Magn Magn Mater, 239(2002): 471], and the alloy is a film sample formed by sputtering. The coercivity is 6.5 kOe.

Comparison example 3 ($Fe_{56}Pt_{44}$) is selected from the literature [Sun et al, IEEE T Magn, 37(2001): 1239], and the alloy is in form of nano-particles obtained by chemical deposition. The coercivity is 9.0 kOe.

Compared with the above-mentioned comparison examples, the nano-porous Fe—Pt permanent magnets disclosed in the present invention show higher coercivity.

Annexed table: Nano-Porous Fe—Pt Alloys with Strong Permanent Magnetism and Precursor Compositions and Magnetic Properties thereof, where $_iH_c$, $M_{50}$ and $M_r$ respectively represent the coercivity, magnetization and remanence under an applied magnetic field of 50 kOe.

| | Porous alloy (at. %) | Precursor alloy (at. %) | $_iH_c$ (kOe) | $M_{50}$ (emu/g) | $M_r$ (emu/g) | Remarks |
|---|---|---|---|---|---|---|
| Embodiment 1 | $Fe_{48.2}Pt_{51.8}$ | $Fe_{60}Pt_{10}B_{30}$ | 18.5 | 52.6 | 34.0 | No need of heat treatment |
| Embodiment 2 | $Fe_{50.1}Pt_{49.9}$ | $Fe_{52}Pt_{29}B_{19}$ | 16.2 | 51.9 | 36.2 | |
| Embodiment 3 | $Fe_{47.7}Pt_{52.3}$ | $Fe_{50}Pt_{20}B_{30}$ | 16.6 | 47.8 | 32.8 | No need of heat treatment |
| Embodiment 4 | $Fe_{46.5}Pt_{53.5}$ | $Fe_{45}Pt_{25}B_{30}$ | 14.7 | 43.3 | 29.6 | |
| Embodiment 5 | $Fe_{49.2}Pt_{50.8}$ | $Fe_{60}Pt_{15}B_{25}$ | 18.1 | 50.9 | 35.3 | |
| Embodiment 6 | $Fe_{52.2}Pt_{47.8}$ | $Fe_{60}Pt_{20}B_{20}$ | 17.8 | 53.9 | 37.2 | |
| Embodiment 7 | $Fe_{52.5}Pt_{47.5}$ | $Fe_{55}Pt_{25}B_{20}$ | 16.9 | 52.4 | 36.6 | |
| Embodiment 8 | $Fe_{45.3}Pt_{54.7}$ | $Fe_{50}Pt_{30}B_{20}$ | 15.9 | 50.8 | 35.6 | No need of heat treatment |
| Embodiment 9 | $Fe_{47.2}Pt_{52.8}$ | $Fe_{40}Pt_{25}B_{35}$ | 14.2 | 40.4 | 28.3 | |
| Embodiment 10 | $Fe_{54.5}Pt_{45.5}$ | $Fe_{70}Pt_{10}B_{20}$ | 13.4 | 56.3 | 36.2 | |
| Embodiment 11 | $Fe_{25.6}Co_{24.8}Pt_{49.6}$ | $Fe_{30}Co_{30}Pt_{20}B_{20}$ | 18.4 | 42.1 | 30.3 | |
| Embodiment 12 | $Fe_{50.8}Pt_{39.8}Pd_{9.4}$ | $Fe_{55}Pt_{20}Pd_5B_{20}$ | 17.0 | 52.9 | 36.5 | |
| Embodiment 13 | $Fe_{49.4}Pt_{50.6}$ | $Fe_{55}Pt_{25}B_{15}C_5$ | 17.3 | 51.1 | 36.4 | |
| Embodiment 14 | $Fe_{46.3}Pt_{53.7}$ | $Fe_{55}Pt_{25}B_{15}P_5$ | 17.9 | 50.9 | 35.8 | |
| Embodiment 15 | $Fe_{45.9}Pt_{54.1}$ | $Fe_{55}Pt_{25}B_{17}Si_3$ | 15.5 | 53.8 | 37.4 | |
| Comparison example 1 | $Fe_{53}Pt_{44}C_3$ | — | 11.1 | — | — | Bulk sample |
| Comparison example 2 | $Fe_{50}Pt_{50}$ | — | 6.5 | — | — | Film sample |
| Comparison example 3 | $Fe_{56}Pt_{44}$ | — | 9.0 | — | — | Nano particles |

We claim:

1. A preparation method for nano-porous Fe—Pt alloys with strong permanent magnetism comprising:
   (1) precursor alloys ingots are prepared using electric arc melting or high-frequency induction melting under an Ar atmosphere;
   (2) amorphous or amorphous+nanocrystalline alloy ribbons are prepared using a single-roller melt-spinning technology, and a thickness and phase structure of the ribbons are controlled by a rotational speed of a copper roller;
   (3) precursors containing uniformly distributed nano-composite phases of hard magnetic $L1_0$-FePt and soft magnetic $Fe_2B$ are directly obtained by melt-spinning or obtained by conducting vacuum annealing on the melt-spun ribbon samples;
   (4) by taking the precursor as a working electrode, Ag/AgCl as a reference electrode, and an acid solution with a $H^+$ concentration of 0.02-1.0 mol/L as an electrolytic solution, dealloying is conducted using electrochemical technique under constant voltages of −0.28-1.5 V, phases mainly including soft magnetic $Fe_2B$ except hard magnetic $L1_0$-FePt are selectively dissolved, and nano-porous Fe—Pt alloys with permanent magnetism containing a single $L1_0$-FePt phase are prepared;
   the nano-porous Fe—Pt alloys with strong permanent magnetism, wherein the nano-porous alloys are composed of ordered hard magnetic of $L1_0$-Fe-Pt phase and have a chemical composition of $Fe_wCo_xPt_yPd_z$, w, x, y and z respectively representing atomic percent of each corresponding element in the expression, where 25≤w≤55, 0≤x≤25, 45≤w+x≤55, 45≤y≤55, 0≤z≤10, 45≤y+z≤55, and w+x+y+z=100;
   the nano-porous alloys are prepared from the precursor alloys through a dealloying technique, and have an integrated doubly-connected nano-porous structure with pore sizes of 10-50 nm, and ligament thicknesses of 20-80 nm;
   an expression of the composition of the precursors for preparing the nano-porous alloys is $Fe_aCo_bPt_cPd_dB_eC_fP_gSi_h$, a, b c, d, e, f, g and h respectively representing atomic percent of each corresponding element in the expression, where 30≤a≤70, 0≤b≤30, 40≤a+b≤70, 8≤c≤40, 0≤d≤5, 8≤c+d≤40, 10≤e≤35, 0≤f≤5, 0≤g≤5, 0≤h≤3, 10≤e+f+g+h≤35, and a+b+c+d+e+f+g+h=100, and
   the nano-porous Fe—Pt alloys with strong permanent magnetism has strong permanent magnetism: under an applied magnetic field of 50 kOe, a coercivity is 13.4-18.5 kOe, a magnetization is 40.4-56.3 emu/g, and a remanence is 28.3-37.4 emu/g.

2. A preparation method for nano-porous Fe—Pt alloys with strong permanent magnetism, comprising:
   (1) raw materials including Fe, Co, Pt, Pd, B, C, $Fe_3P$, and Si with a purity of ≥99 wt. % are weighed and mixed according to a nominal composition of $Fe_aCo_bPt_cPd_dB_eC_fP_gSi_h$;
   (2) the alloys containing P and/or C element(s) are prepared into master alloy ingots using high-frequency induction melting under an Ar atmosphere, and P- and C-free alloys are prepared into master alloy ingots using a nonconsumable electric-arc furnace under an Ar atmosphere; the alloys are repeatedly melted for four times to guarantee chemical homogeneity; the master alloy ingots are spun into continuous ribbon samples with a width of about 2 mm and thicknesses of about 10-50 μm using a single-roller melt-spinning equipment under an Ar atmosphere, and a ribbon thickness is controlled by a rotational speed of a copper roller;
   (3) structure and thermal properties of the alloy ribbon samples prepared at different rotational speeds of the copper roller are examined; an annealing temperature of the alloy ribbons is determined in combination of structure and thermal analysis; and if the alloy ribbons contain a nano-composite phase structure of hard magnetic $L1_0$-FePt and soft magnetic $Fe_2B$, step (5) is directly performed; otherwise, step (4) is performed;
   (4) the alloy ribbons are annealed using vacuum heat treatment to obtain ribbon precursors containing a nano-composite phase structure of hard magnetic $L1_0$-FePt and soft magnetic $Fe_2B$;
   (5) nanocrystalline ribbon precursors are dealloyed by an electrochemical workstation, phases mainly including soft magnetic $Fe_2B$ except hard magnetic $L1_0$-FePt are selectively dissolved, and the nano-porous Fe—Pt alloys with permanent magnetism containing a single $L1_0$-FePt phase are prepared; and (6) structure characterization, morphology observation and magnetic property tests are conducted on the obtained nano-porous alloy;

a structure of each of the ribbon samples, the precursor alloys and the dealloyed nano-porous metals is characterized by an X-ray diffractometer and a high-resolution transmission electron microscope; a morphology of the nano-porous metals is observed through a scanning electron microscope; a ligament composition of the nano-porous metals is determined by energy spectrum analysis; thermal properties of the ribbon samples are evaluated by a differential scanning calorimeter; electrochemical properties of the precursor alloys are evaluated by the electrochemical workstation; and magnetic properties of the alloy ribbons and the nano-porous metals are tested using a superconducting quantum interference device;

the nano-porous Fe—Pt alloys with strong permanent magnetism, wherein the nano-porous alloys are composed of ordered hard magnetic of $L1_0$-FePt phase and have the chemical composition of $Fe_wCo_xPt_yPd_z$, w, x, y and z respectively representing atomic percent of each corresponding element in the expression, where 25≤w≤55, 0≤x≤25, 45≤w+x≤55, 45≤y≤55, 0≤z≤10, 45≤y+z≤55, and w+x+y+z=100;

the nano-porous alloys are prepared from precursor alloys through a dealloying technique, and have an integrated doubly-connected nano-porous structure with pore sizes of 10-50 nm, and ligament thicknesses of 20-80 nm;

an expression of the composition of the precursors for preparing the nano-porous alloys is $Fe_aCo_bPt_cPd_dB_eC_fP_gSi_h$, a, b c, d, e, f, g and h respectively representing atomic percent of each corresponding element in the expression, where 30≤a≤70, 0≤b≤30, 40≤a+b≤70, 8≤c≤40, 0≤d≤5, 8≤c+d≤40, 10≤e≤35, 0≤f≤5, 0≤g≤5, 0≤h≤3, 10≤e+f+g+h≤35, and a+b+c+d+e+f+g+h=100; and the nano-porous Fe—Pt alloys with strong permanent magnetism, having strong permanent magnetism: under an applied magnetic field of 50 kOe, a coercivity is 13.4-18.5 kOe, a magnetization is 40.4-56.3 emu/g, and a remanence is 28.3-37.4 emu/g.

* * * * *